(12) United States Patent
Jackson et al.

(10) Patent No.: US 10,272,649 B2
(45) Date of Patent: Apr. 30, 2019

(54) DURABLE PROTECTIVE COVERS WITH STIFFENING RODS FOR PREVENTING SPILLED LIQUIDS FROM FLOWING INTO DRAINS OR HOLES

(71) Applicant: NEW PIG CORPORATION, Tipton, PA (US)

(72) Inventors: Dane R. Jackson, Port Matilda, PA (US); Daniel A. Silver, State College, PA (US)

(73) Assignee: New Pig Corporation, Tipton, PA (US)

( * ) Notice: Subject to any disclaimer, the term of this patent is extended or adjusted under 35 U.S.C. 154(b) by 0 days.

(21) Appl. No.: 15/709,554

(22) Filed: Sep. 20, 2017

(65) Prior Publication Data

US 2018/0079182 A1    Mar. 22, 2018

Related U.S. Application Data

(60) Provisional application No. 62/397,092, filed on Sep. 20, 2016.

(51) Int. Cl.
*B32B 3/04* (2006.01)
*B32B 3/26* (2006.01)
(Continued)

(52) U.S. Cl.
CPC ............... *B32B 25/08* (2013.01); *B32B 3/04* (2013.01); *B32B 3/266* (2013.01); *B32B 5/022* (2013.01); *B32B 7/08* (2013.01); *B32B 7/12* (2013.01); *B32B 25/10* (2013.01); *B32B 25/12* (2013.01); *B32B 25/14* (2013.01); *B32B 27/08* (2013.01); *B32B 27/12* (2013.01); *B32B 27/286* (2013.01); *B32B 27/304* (2013.01); *B32B 27/32* (2013.01); *B32B 27/40* (2013.01); *E03F 5/0411* (2013.01); *B32B 2262/0238* (2013.01); *B32B 2262/0253* (2013.01); *B32B 2262/0261* (2013.01); *B32B 2262/0276* (2013.01); *B32B 2262/0292* (2013.01); *B32B 2262/062* (2013.01);
(Continued)

(58) Field of Classification Search
CPC ....................................................... B32B 25/08
USPC ............................................................. 4/293
See application file for complete search history.

(56) References Cited

U.S. PATENT DOCUMENTS 962,570 A    6/1910  Hufschmidt
1,622,850 A    3/1927  Schacht
(Continued)

FOREIGN PATENT DOCUMENTS

DE    202 10573 U1    11/2002
DE    20 2004 019761 U1    5/2006
(Continued)

*Primary Examiner* — Lori L Baker
(74) *Attorney, Agent, or Firm* — Alan G. Towner, Esq.; Leech Tishman Fuscaldo & Lampl

(57) ABSTRACT

Protective drain covers, include stiffening members at one end or at opposing ends to increase rigidity in one direction while leaving the other direction flexible. The increased rigidity in the one direction improves the ability to handle and accurately position the protective drain cover for use, while the flexibility in the other direction allows the protective drain cover to be rolled up for storage and future use. The stiffening member(s) can be used as hand-holds to assist in the placement of the heavy protective drain cover and then removal of protective drain cover after use.

20 Claims, 6 Drawing Sheets

(51) Int. Cl.

| | | |
|---|---|---|
| B32B 5/02 | (2006.01) | |
| B32B 7/08 | (2019.01) | |
| B32B 7/12 | (2006.01) | |
| E03F 5/04 | (2006.01) | |
| B32B 25/08 | (2006.01) | |
| B32B 25/10 | (2006.01) | |
| B32B 25/12 | (2006.01) | |
| B32B 25/14 | (2006.01) | |
| B32B 27/08 | (2006.01) | |
| B32B 27/12 | (2006.01) | |
| B32B 27/28 | (2006.01) | |
| B32B 27/30 | (2006.01) | |
| B32B 27/32 | (2006.01) | |
| B32B 27/40 | (2006.01) | |

(52) U.S. Cl.
CPC ..... B32B 2262/101 (2013.01); B32B 2307/31 (2013.01); B32B 2307/7265 (2013.01); B32B 2581/00 (2013.01)

(56) References Cited

U.S. PATENT DOCUMENTS

| | | | |
|---|---|---|---|
| 1,742,369 A | 1/1930 | Probst et al. | |
| 1,825,499 A | 9/1931 | Zorn | |
| 1,912,312 A | 5/1933 | Schacht | |
| 2,611,904 A | 9/1952 | Gross | |
| 4,031,676 A | 6/1977 | Dally | |
| 4,139,117 A | 2/1979 | Dial | |
| 4,208,469 A | 6/1980 | Dial | |
| 4,765,775 A | 8/1988 | Kroger | |
| 4,799,821 A | 1/1989 | Broderson | |
| 4,813,811 A | 3/1989 | Adams | |
| 4,838,732 A | 6/1989 | Clark et al. | |
| 4,981,391 A | 1/1991 | Klementovich | |
| 4,988,234 A | 1/1991 | Henkel et al. | |
| 5,236,281 A | 8/1993 | Middleton | |
| 5,379,555 A | 1/1995 | Strieb et al. | |
| 6,338,168 B1 | 1/2002 | Valentine | |
| 6,530,722 B1 | 3/2003 | Shaw et al. | |
| 7,950,075 B2 * | 5/2011 | Evans, Jr. | A47K 1/14 4/293 |
| 8,117,686 B2 | 2/2012 | Powell et al. | |
| 9,852,668 B2 * | 12/2017 | Peters | G09F 17/00 |
| 2004/0157074 A1 | 8/2004 | Hubbard | |
| 2004/0237180 A1 | 12/2004 | Evans, Jr. et al. | |
| 2005/0170143 A1 | 8/2005 | Yau | |
| 2005/0175665 A1 * | 8/2005 | Hunter | A61K 45/06 424/423 |
| 2005/0262624 A1 | 12/2005 | Evans, Jr. et al. | |
| 2007/0033722 A1 * | 2/2007 | Evans, Jr. | A47K 1/14 4/293 |
| 2009/0100584 A1 * | 4/2009 | Powell | A47K 1/14 4/293 |
| 2011/0290683 A1 * | 12/2011 | High | A63B 55/57 206/315.7 |
| 2013/0185856 A1 * | 7/2013 | Powell | A47K 1/14 4/293 |
| 2014/0318007 A1 * | 10/2014 | Hogan | F16M 11/18 47/39 |
| 2015/0194081 A1 * | 7/2015 | Peters | G09F 17/00 248/218.4 |
| 2018/0079182 A1 * | 3/2018 | Jackson | B32B 5/022 |
| 2018/0090038 A1 * | 3/2018 | Kesler | G09F 17/00 |
| 2018/0102074 A1 * | 4/2018 | Peters | G09F 17/00 |

FOREIGN PATENT DOCUMENTS

| | | | |
|---|---|---|---|
| DE | 10 2007 017410 A1 | 10/2008 | |
| FR | 3001980 B1 | 2/2015 | |
| WO | WO 2010074691 A1 * | 7/2010 | ............... A47K 1/14 |

* cited by examiner

DURABLE PROTECTIVE COVERS WITH STIFFENING RODS FOR PREVENTING SPILLED LIQUIDS FROM FLOWING INTO DRAINS OR HOLES

CROSS-REFERENCE TO RELATED APPLICATION

This application claims priority from U.S. Provisional Application No. 62/397,092 filed Sep. 20, 2016, which is incorporated herein by reference.

FIELD OF THE INVENTION

The present invention relates to durable protective covers with stiffening rods for preventing spilled liquids from flowing into drains or holes.

BACKGROUND INFORMATION

Portable protective covers are disclosed in U.S. Pat. No. 8,117,686, entitled "Durable Protective Cover for Preventing Spilled Liquids from Flowing into Drains or Holes", which is incorporated herein by reference. While such covers work well in preventing liquids from flowing into drains, heavier or larger size units can be difficult to handle and position due to their lack of stiffness across their width. Their intrinsic tackiness can also make removal difficult since there is no feature to facilitate grabbing of the protective cover with sufficient force for removal from drains.

SUMMARY OF THE INVENTION

The present invention provides protective drain covers, including stiffening members at one end or at opposite ends to increase rigidity in one direction while leaving the other direction flexible. The increase rigidity in the one direction improves the ability to handle and accurately position the protective drain cover for use, while the flexibility in the other direction allows the protective drain cover to be rolled up for storage and future use. The stiffening member(s) can be used as hand-holds to assist in the placement of the heavy protective drain cover and then removal of protective drain cover after use.

In certain embodiments, the protective drain cover includes a top covering layer extended outwardly from a tacky sealing layer on two opposing ends. The ends of the extended top covering may be wrapped around a stiffing member, such as hollow pipe, and secured back upon itself. The top covering can be secured to itself, for example, by stitching, gluing, riveting, heat sealing, RF sealing or ultrasonic sealing. Notches or holes may be cut into the extended top covering to expose the stiffening member as to create handholds. The handholds on each side may be placed 18 to 30 inches apart (center to center) for comfortable gripping.

In other embodiments, the protective drain cover includes a stiffening member placed or molded within a tacky sealing layer. Notches or holes may be placed in the combined durable top layer and the tacky sealing layer to create handholds. The thickness of the tacky sealing layer may not accommodate a large diameter stiffening member, so the embedded stiffening member may have relatively small diameter. For increased holding comfort, the small diameter stiffening member may have a larger tube or encasement covering it in the handhold areas.

An aspect of the present invention is to provide a durable protective cover for removable installation over a drain comprising a durable backing layer and a pliable, tacky sealing layer structured and arranged to block spills from entering the drain, wherein the protective cover has a first end comprising a first stiffening rod extending over at least a portion thereof. In certain embodiments, the protective cover has a second end opposing the first end comprising a second stiffening rod extending over at least a portion thereof.

This and other aspects of the present invention will be more apparent from the following description.

DETAILED DESCRIPTION

The present invention provides a durable protective cover which prevents spills and/or other unwanted liquids from flowing into drains or holes. At least a portion of the liquid is prevented from flowing into a drain or hole by the protective cover. The spill or unwanted liquid may be any flowable material such as hazardous liquids, storm water, hydrocarbons, chemicals, debris, dirt, trash and the like which are desired to be kept out of drains and the like. As used herein, the term "drains or holes" means any drain, hole or other opening such as a vent, manhole or the like through which it is desired to prevent the flow of spills or unwanted liquids.

Figure 1:
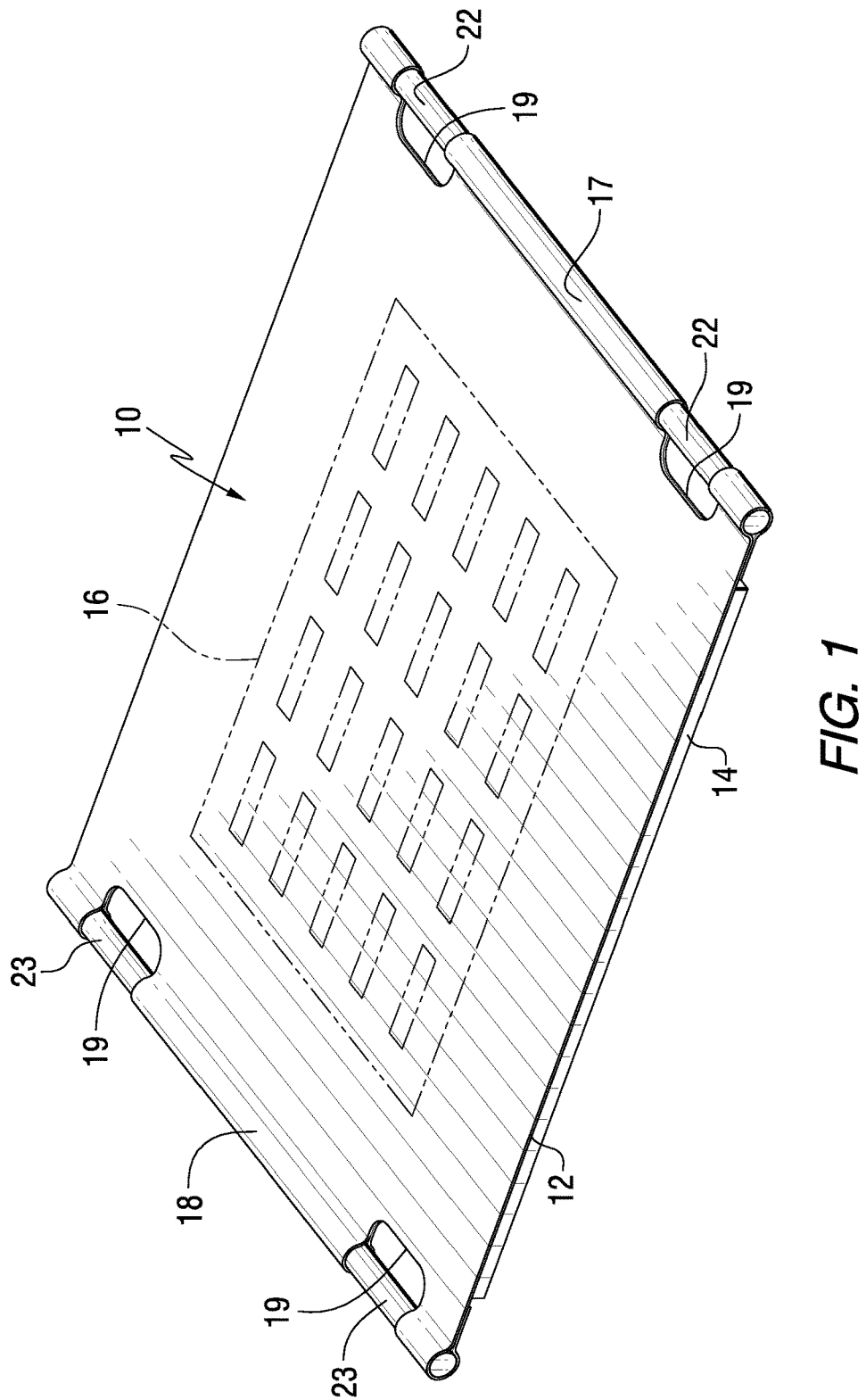
FIG. 1 is an isometric view of a protective cover installed over a drain in accordance with an embodiment of the present invention.
Figure 2:
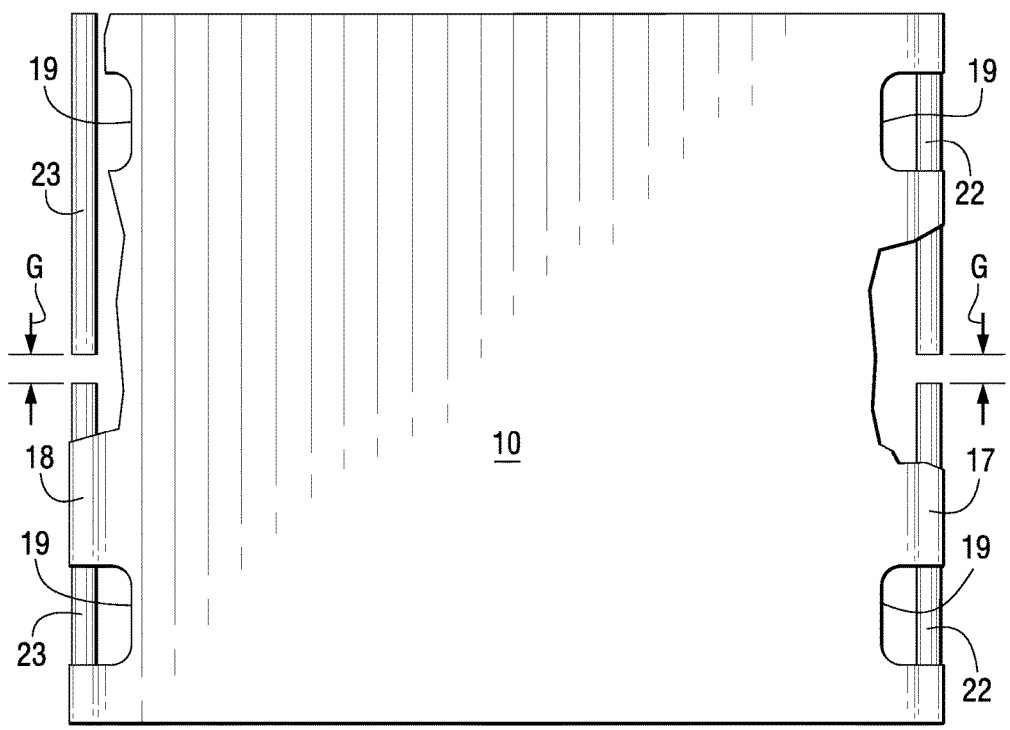
FIG. 2 is a partially broken away top view of the protective cover of FIG. 1.
Figure 3:
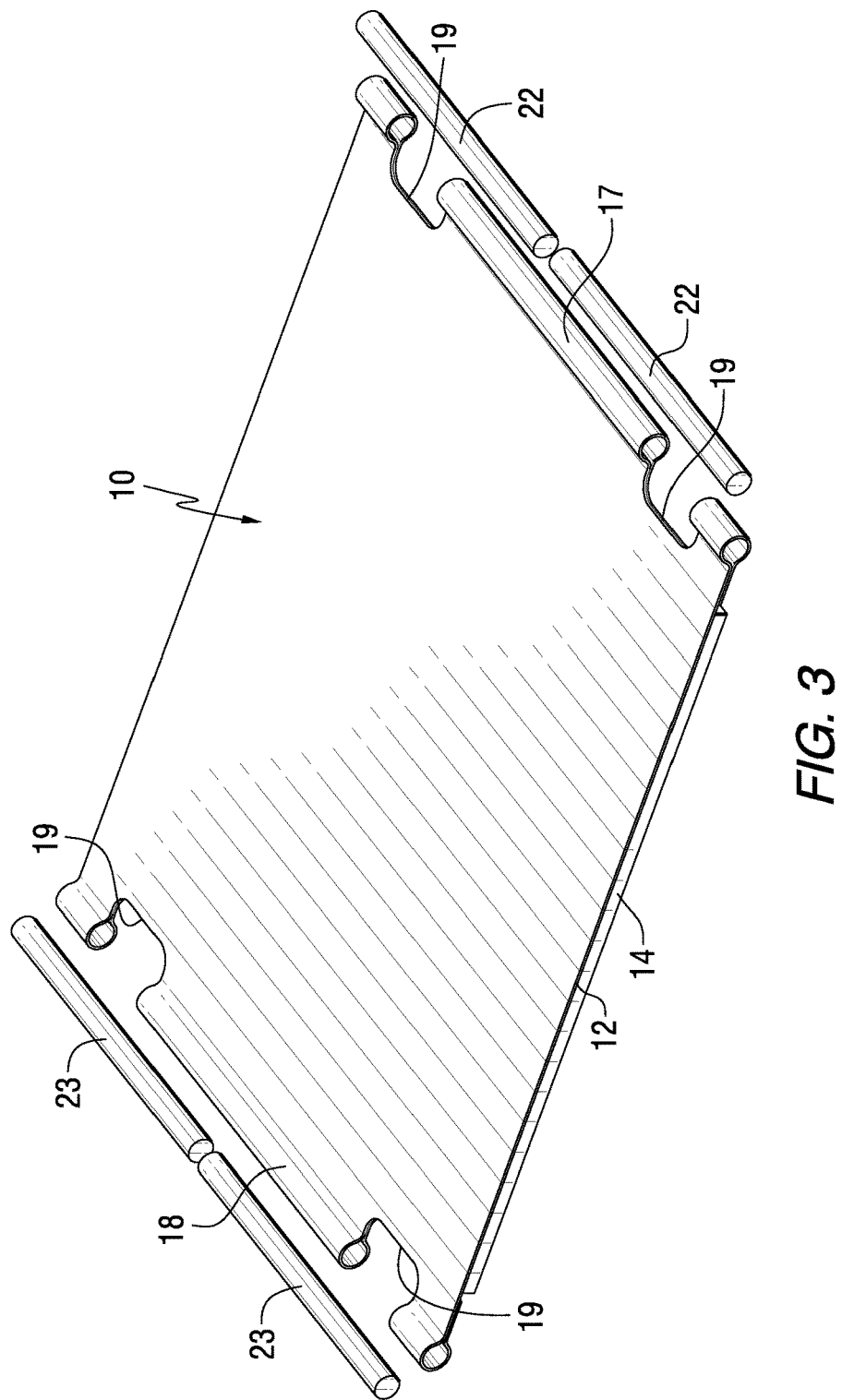
FIG. 3 is an exploded isometric view of the protective cover of FIG. 1.

FIGS. 1-3 illustrate a protective cover 10 in accordance with an embodiment of the present invention. The protective cover 10 includes an upper durable backing layer 12 and a lower pliable, tacky sealing layer 14. The protective cover 10 is installed over a drain 16. A first pocket 17 is provided at one end of the protective cover 10, and a second pocket 18 is provided at a second end of the protective cover opposite the first end. Two hand holes 19 are provided near the first and second ends of the protective cover 10. A first stiffening rod 22 is inserted in the first pocket 17, and a second stiffening rod 23 is inserted in the second pocket 18. The first and second stiffening rods 22 and 23 are exposed in the areas of the hand holes 19, but are otherwise located inside the first and second pockets 17 and 18, respectively. In the embodiment shown, the protective cover 10 includes two stiffening rods 22 and 23; however, it is to be understood that only one stiffening rod may be used in certain embodiments.

As shown most clearly in FIGS. 2 and 3, each of the stiffening rods 22 and 23 may be provided as two separate pieces having a gap G therebetween. In accordance with this embodiment, the two-piece stiffening rod design allows the protective cover 10 to be folded over length-wise if desired for transportation and storage purposes. The gap G may be sufficiently large to permit folding of the protective cover 10. For example, the gap G may be greater than or equal to the diameters of the first and second stiffening rods 22 and 23. In other embodiments, the gap may be eliminated and each stiffening rod 22 and 23 may be provided as a single piece.

Each of the stiffening rods 22 and 23 may be made from any suitable material, such as solid or hollow metal or plastic such as PVC, solid wood, or the like. The first and second stiffening rods 22 and 23 may have any suitable diameter, for example, from 0.1 to 1.5 inch, or from 0.2 to 1 inch, or from 0.25 to 0.75 inch. The first and second stiffening rods 22 and 23 may be secured within their respective pockets 17 and 18 by any suitable means such as conventional adhesives, mechanical fasteners, and the like.

Figure 4:
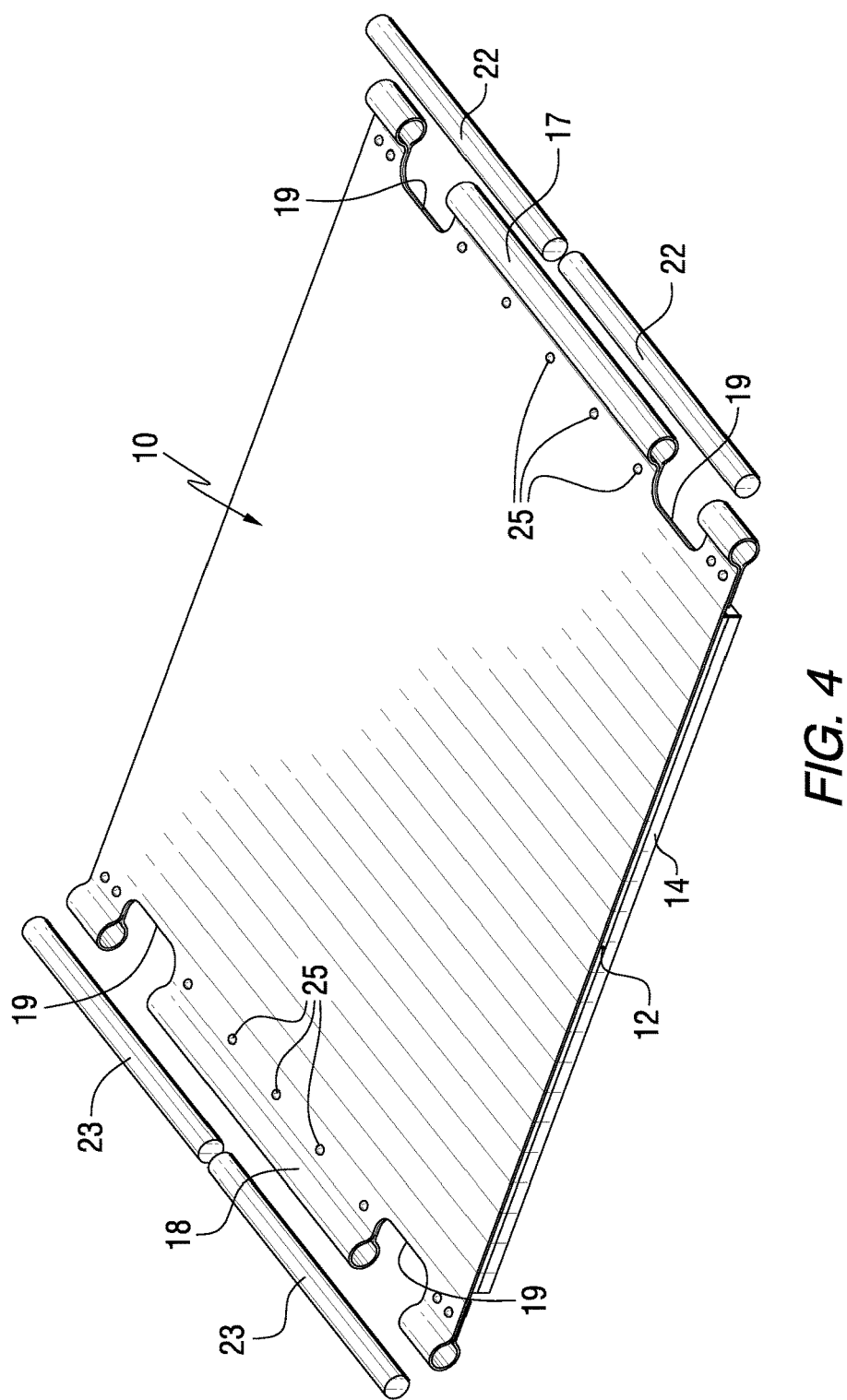
FIG. 4 is an exploded isometric view of a protective cover in accordance with another embodiment of the present invention.

FIG. 4 illustrates an alternative embodiment of the protective cover 10 in which mechanical fasteners 25, such as rivets, snaps, or screws are used to form the first and second pockets 17 and 18. As shown, the upper durable backing layer 12 is folded over upon itself to form the first and second pockets 17 and 18, and the fasteners 25 are used to securely maintain the pockets.

Figure 5:
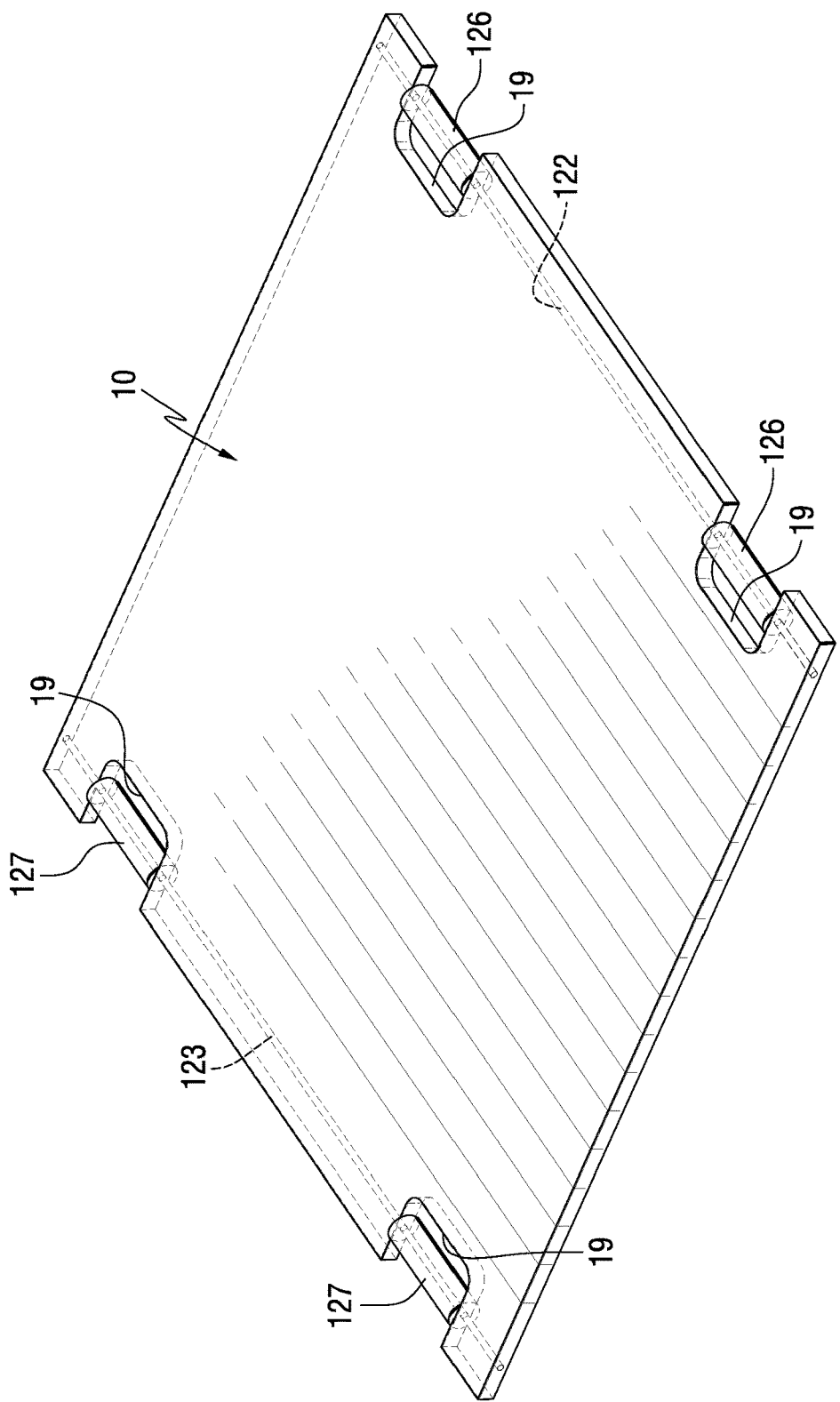
FIG. 5 is an isometric view of a protective cover in accordance with another embodiment of the present invention.

FIG. 5 illustrates the protective cover 10 with an alternative stiffening rod arrangement in accordance with an embodiment of the present invention. A first stiffening rod 122 having a relatively small diameter is positioned adjacent to the first edge of the protective cover 10, and a second stiffening rod 123 having a relatively small diameter is positioned at the second end of the protective cover 10. Hollow cylinders 126 are installed on the first stiffening rod 122, and form handles in the regions of the hand holes 19. Similarly, cylindrical members 127 are installed on the second stiffening rod 123 to provide handles in the hand hole regions at the second end of the protective cover 10. The first and second stiffening rods 122 and 123 may be secured to the protective cover 10 by any suitable means, such as being laminated between layers of the protective cover 10, whereby end pockets (not shown) similar to those shown in the embodiments of FIGS. 1-4. The first and second stiffening rods 122 and 123 may have typical diameters of from 0.1 to 0.4 inch, and may be made from any suitable materials, such as solid metal, plastic, or wood. The first and second cylindrical handle members 126 and 127 may have typical diameters of from 0.2 to 1.5 inch, and may be made of any suitable materials, such as hollow plastic or metal.

Figure 6:
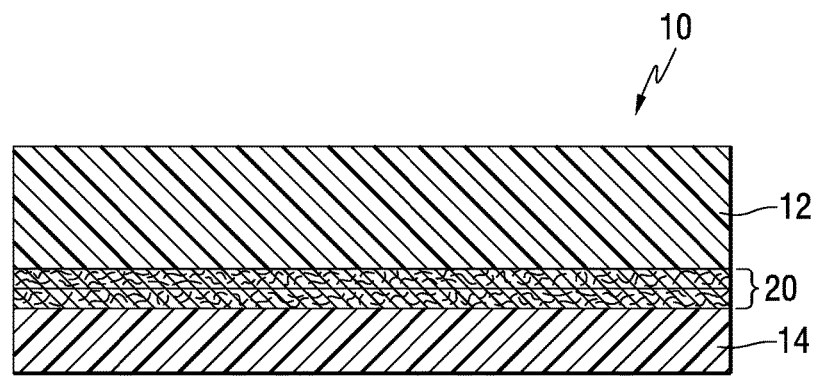
FIG. 6 is a partially schematic side-sectional view of a portion of a protective cover in accordance with an embodiment of the present invention.

FIG. 6 is a side sectional view of the durable protective cover 10 in accordance with an embodiment of the present invention. The protective cover 10 includes a durable backing layer 12 and a pliable, tacky sealing layer 14 covering at least a portion of the underside of the durable backing layer 12. A low-density bonding layer 20 is provided between the durable backing layer 12 and the pliable, tacking sealing layer 14. The protective cover 10 as shown is generally square in shape, however, any other suitable shape may be used such as rectangular, round, etc.

As shown in FIG. 1, the protective cover 10 can be positioned for installation over a drain 16 to prevent unwanted liquid from entering the drain. The protective cover 10 adheres to the surface surrounding a drain 16, forming a seal which is sufficient to prevent the flow of at least some liquid past the protective cover 10. The sealing layer 14 creates an effective seal even when the surface surrounding the drain is not smooth. The protective cover 10 may be utilized to cover virtually any type of drain or hole 16 so long as at least a portion of the pliable, tacky sealing layer 14 of the protective cover 10 is sized to extend beyond the dimensions of the drain 16 and form a sufficient seal therearound. In one embodiment, the protective cover 10 can be positioned over relatively large areas, e.g., at least 1 square foot up to 25 square feet or more. In another embodiment, the protective cover 10 may be provided in strip form for covering a portion of a drain or the area around the drain to act as a dike or spill diverter.

The durable backing layer 12 can have a length of from about 1 foot to about 10 or 12 feet, and a width of from about 1 foot to about 10 or 12 feet. The lengths of the first and second stiffening rods may be similar to the widths of the durable backing layer. The sealing layer 14 has a length of from about 1 foot to about 10 or 12 feet, and a width of from about 1 foot to about 10 or 12 feet. For example, a protective cover 10 positioned over a drain 16 can have a backing layer length and width, as well as a sealing layer length and width, which are at least 2 or 3 inches greater than the length and width of the drain 16.

Both the durable layer 12 and the pliable, tacky sealing layer 14 will resist water, oil and many chemicals making the protective cover 10 suitable for use in many types of work environments, including hazardous work environments. The protective cover 10 is readily reusable and cleans up easily with soap and water.

As shown in FIG. 6, a low-density bonding layer 20 may be provided between the pliable, tacky sealing layer 14 and the durable backing layer 12. As used herein, the term "low-density bonding layer" means a deep pile or lofty material having at least one surface comprising entanglement fibers that extend from the layer to provide additional surface area and attachment sites for the adjacent durable backing layer 12 and/or pliable, tacky sealing layer 14. The low-density bonding layer 20 has a density that is typically less than 0.26 ounces per cubic inch, preferably from 0.02 to 0.1 ounces per cubic inch. The low-density bonding layer 20 has a typical thickness of at least 0.01 inch, for example, from 0.02 to 0.25 inch. In one embodiment, the thickness is from 0.04 to 0.06 inch. The low-density bonding layer 20 typically has a weight per area of less than 20 ounces per square yard, for example, from 1 to 10 ounces per square yard. The low-density bonding layer 20 provides secure and permanent attachment between the durable backing layer 12 and the pliable, tacky sealing layer 14, while maintaining separation between the materials of the adjacent layers 12 and 14. In contrast with an open mesh or permeable screen material that would allow the layers 12 and 14 to contact each other, the low-density bonding layer 20 maintains separation between the layers 12 and 14.

The low-density bonding layer 20 may be non-woven and may comprise entanglement fibers made of polyester, polypropylene, poly(ethylene propylene), polyvinylchloride, fiberglass, nylon, cotton, urethane and the like. In one embodiment, the low-density bonding layer 20 comprises a base or backing layer from which the entanglement fibers extend on one or both sides of the backing layer. For example, the low-density bonding layer 20 may comprise fleece made of polyester and having a thickness of 0.055 inch. The fleece assists in the adhesion of the pliable, tacky sealing layer 14 to the durable backing layer 12. The embedded fleece layer may also provide puncture resistance, e.g., when the protective cover is used for drains that are exposed to vehicle traffic. Thus, the protective cover may be driven over.

The durable backing layer 12 is liquid impermeable, and is made of a flexible and durable material. The durable backing layer 12 can have a tensile strength at least 25 percent higher than the tensile strength of the tacky sealing layer 14. In one embodiment, the protective cover 10 has sufficient durability to be driven over by an industrial vehicle while positioned over a drain. The protective cover 10 is also sufficiently durable to withstand foot traffic over the cover. The durable backing layer 12 can comprise any suitable material such as natural rubber, synthetic rubber, nitrile rubber or plastics such as thermoplastic olefin, polyvinyl chloride, chlorosulfonated polyethylene and the like. In one embodiment, the durable backing layer 12 may be a composite material. Examples of composite materials include rubber laminated to plastic film, plastic film laminated to mesh, rubber laminated to mesh and combinations thereof. The thickness of the durable backing layer 12 typically ranges from 0.01 to 0.25 inch.

The pliable, tacky sealing layer 14 is flexible and tacky such that it conforms to irregularities or roughness in the spill surface and adheres to the surface surrounding a drain to thereby provide a seal between the layer 14 and surface which reduces or eliminates the flow of spilled liquids. The pliable, tacky sealing layer 14 is made of a different material from the durable backing layer 12. The pliable, tacky sealing layer 14 can comprise materials such as urethane, polyurethane, polyvinyl chloride and/or silicone. The pliable tacky layer 14 may have a hardness, as measured by a durometer, at least 10 percent less than the hardness of the durable backing layer 12. In one embodiment, the pliable, tacky sealing layer has a durometer hardness of less than 30 shore A. The pliable, tacky sealing layer 14 may also provide shock absorption for foot traffic, and may serve to keep the protective cover in its desired location due to its tacky surface. The pliable, tacky sealing layer 14 can comprise an inherently tacky material or can have a standard tackifier applied to any exposed surface. The pliable, tacky sealing layer 14 can have a tackiness such that it adheres to a surface surrounding a drain or hole to prevent the flow of liquid from entering the drain. In one embodiment, the pliable, tacky sealing layer 14 has sufficient tackiness such that the sealing layer adheres when pressed against a vertical wall. The tackiness of the sealing layer 14 may also be measured by other test methods known to those skilled in the art, such as rolling ball, peel and probe tests. The pliable, tacky sealing layer 14 has a typical thickness of from 0.01 to 2 inches, for example, from 0.1 to 0.5 inch.

In one embodiment, a mixture of various polyurethanes can be used to make the sealing layer 14. A typical polyurethane mixture comprises from about 50 to about 80 weight percent polyol, and from about 20 to about 50 weight percent isocyanate. The liquid polyurethane is mixed and cured in a manner which gives it a moderate degree of inherent tackiness to all exposed surfaces of the polyurethane material. The molding and curing process creates a substantially smooth exposed surface, which may contain minor undulations. The polyurethane material is soft, yet resilient, and thus may be easily severed by a user with a knife. Surfaces of the polyurethane material which are exposed when a portion of it is severed can also be inherently tacky. While a process is described above for manufacturing polyurethane having an inherent tackiness, one skilled in the art will appreciate that other materials, such as, for example, vinyls, silicones and rubbers, may also be modified to have an inherent tackiness.

In one embodiment, the low-density bonding layer 20 can be deposited on the surface of the durable backing layer 12 through hot air roll laminating or brought into contact with the durable backing layer 12 before it is cured or cooled so that the fibers or protuberances in the Z direction or the openings or voids in the low-density bonding layer are at least partially embedded within the durable backing layer 12. Once the fibers of the low-density bonding layer are embedded within, or otherwise adhered to, the durable backing layer 12, the pliable, tacky sealing layer 14 can be applied to the exposed surface of the durable backing layer 12 including the low-density bonding layer 20. As the pliable, tacky sealing layer 14 cures or cools, the low-density bonding layer 20 improves adhesion between the durable backing layer 12 and the pliable, tacky sealing layer 14.

In accordance with an embodiment of the present invention, the protective cover does not include any type of additional reinforcing layer in, or adjacent to, the backing layer 12, the pliable, tacky sealing layer 14, or the low-density bonding layer 20. Such a non-reinforced protective cover has been found to possess sufficient durability for extended uses, while still maintaining sufficient flexibility and relatively light weight for ease of installation and removal at various types of spill sites.

Figure 7:
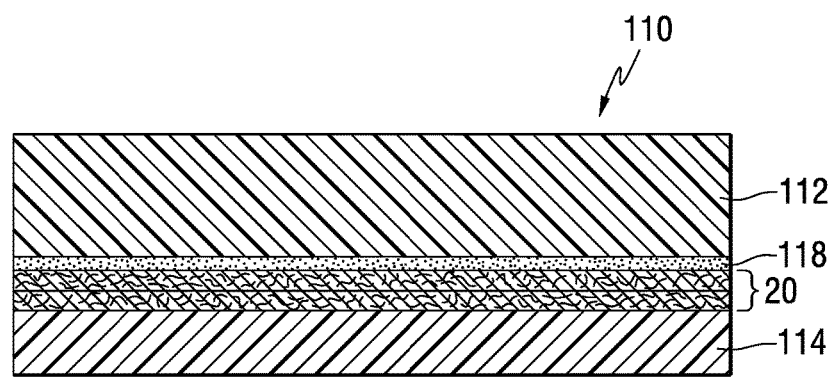
FIG. 7 is a partially schematic side-sectional view of a portion of a protective cover in accordance with another embodiment of the present invention.

FIG. 7 illustrates a durable protective cover 110 similar to the cover shown in FIG. 6, except the durable backing layer 112 is secured to the low-density bonding layer 20 and pliable, tacky sealing layer 114 by an adhesive layer 118. The adhesive layer 118 may comprise any suitable adhesive, such as a hot melt adhesive comprising polyethylene, polypropylene, styrene butadiene rubber, styrenes, nylon, or the like. For example, the adhesive layer may comprise polyethylene having a thickness of about 0.002 inch.

The durable protective covers of the present invention form effective seals around drains, are generally lightweight, and are capable of quick and easy implementation even for large drains. The durable protective covers are readily reusable and transportable, and may be quickly implemented to seal a drain and/or hole in an emergency situation. The protective cover may be implemented for use with a variety of different types and sizes of drains and/or holes, and forms a tight seal around the drain/hole to block out unwanted liquids from entering the drain or hole. The protective cover may also be provided in strip form that may be installed around the periphery of a drain or other area to act as a dike or spill diverter. The protective cover may also serve as an anti-fatigue mat in areas exposed to foot traffic or in areas where people stand for significant amounts of time, in which case the pliable, tacky sealing layer provides shock absorption and maintains the cover in its desired position, while the durable layer resists tearing, abrasion and puncture caused by foot traffic and debris.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A durable protective cover for removable installation over a drain comprising:
   a durable backing layer; and
   a pliable, tacky sealing layer structured and arranged to block spills from entering the drain,
   wherein the protective cover has a first end comprising a first stiffening rod extending over at least a portion thereof and a second end opposing the first end comprising a second stiffening rod extending over at least a portion thereof, wherein the first stiffening rod is located at least partially within a first pocket running along the first end of the protective cover, the second stiffening rod is located at least partially within a second pocket running along the second end of the protective cover, and a portion of each of the first and second stiffening rod is exposed outside of the first and second pockets to provide a handle.

2. The protective cover of claim 1, wherein the first and second stiffening rods are secured within the first and second pockets by an adhesive.

3. The protective cover of claim 1, wherein the protective cover comprises cut out openings in regions adjacent to the exposed portions of the first and second stiffening rods.

4. The protective cover of claim 1, wherein the first stiffening rod comprises two pieces, and the second stiffening rod comprises two pieces.

5. The protective cover of claim 4, further comprising a gap between the two pieces of the first stiffening rod, and a gap between the two pieces of the second stiffening rod.

6. The protective cover of claim 5, wherein the gaps are greater than or equal to diameters of the first and second stiffening rods.

7. The protective cover of claim 1, wherein the first and second stiffening rods have diameters of from 0.1 to 1 inch.

8. The protective cover of claim 1, wherein the first and second stiffening rods have lengths of from 1 to 10 feet.

9. The protective cover of claim 1, wherein the durable backing layer has a length of at least 1 foot and a width of at least 1 foot.

10. The protective cover of claim 1, wherein the durable backing layer has a thickness of from about 0.01 to about 0.25 inch and comprises natural rubber, synthetic rubber, nitrile rubber, thermoplastic olefin, polyvinyl chloride and/or chlorosulfonated polyethylene.

11. The protective cover of claim 1, wherein the pliable, tacky sealing layer has a length of at least 1 foot and a width of at least 1 foot.

12. The protective cover of claim 1, wherein the pliable, tacky sealing layer has a thickness of from 0.01 to 2 inches and has a durometer hardness of less than 30 shore A.

13. The protective cover of claim 1, wherein the pliable, tacky sealing layer comprises urethane, polyurethane, polyvinyl chloride and/or silicone.

14. The protective cover of claim 1, wherein the protective cover further comprises a low-density bonding layer between the durable backing layer and the pliable, tacky sealing layer.

15. The protective cover of claim 14, wherein the low-density bonding layer has a thickness of at least 0.01 inch.

16. The protective cover of claim 1, wherein the low-density bonding layer comprises entanglement fibers comprising polyester, polypropylene, poly(ethylene propylene), polyvinylchloride, fiberglass, nylon, cotton and/or urethane.

17. The protective cover of claim 1, further comprising an adhesive layer between the low-density bonding layer and the durable backing layer.

18. A durable protective cover for removable installation over a drain comprising:
    a durable backing layer; and
    a pliable, tacky sealing layer structured and arranged to block spills from entering the drain,
    wherein the protective cover has a first end comprising a first stiffening rod extending over at least a portion thereof and a second end opposing the first end comprising a second stiffening rod extending over at least a portion thereof, the first stiffening rod is located at least partially within a first pocket running along the first end of the protective cover, the second stiffening rod is located at least partially within a second pocket running along the second end of the protective cover, and the first and second stiffening rods are secured within the first and second pockets by an adhesive.

19. A durable protective cover for removable installation over a drain comprising:
    a durable backing layer; and
    a pliable, tacky sealing layer structured and arranged to block spills from entering the drain,
    wherein the protective cover has a first end comprising a first stiffening rod extending over at least a portion thereof and a second end opposing the first end comprising a second stiffening rod extending over at least a portion thereof, the first stiffening rod comprises two separate pieces, and the second stiffening rod comprises two separate pieces.

20. The durable protective cover of claim 19, comprising a gap between the two separate pieces of the first stiffening rod, and a gap between the two separate pieces of the second stiffening rod.

* * * * *